United States Patent
Lee et al.

(10) Patent No.: US 7,630,171 B2
(45) Date of Patent: Dec. 8, 2009

(54) HARD DISK DRIVE HAVING A BALANCE WEIGHT TO COMPENSATE FOR AN IMBALANCE IN THE DISK STACK ASSEMBLY

(75) Inventors: Kyung-Yul Lee, Suwon-si (KR); Sung-Wook Kim, Suwon-si (KR); Youn-Tai Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 371 days.

(21) Appl. No.: 11/585,890

(22) Filed: Oct. 25, 2006

(65) Prior Publication Data

US 2007/0121242 A1    May 31, 2007

(30) Foreign Application Priority Data

Nov. 28, 2005    (KR) .................. 10-2005-0114044

(51) Int. Cl.
*G11B 17/02*    (2006.01)
(52) U.S. Cl. .................................. 360/99.12
(58) Field of Classification Search ........... 360/98.07, 360/98.08, 99.08, 99.12
See application file for complete search history.

(56) References Cited

U.S. PATENT DOCUMENTS

| | | | |
|---|---|---|---|
| 7,064,923 B2* | 6/2006 | Tran et al. ................ | 360/99.08 |
| 7,215,509 B2* | 5/2007 | Ng .......................... | 360/99.12 |
| 2002/0024763 A1* | 2/2002 | Drake et al. ............ | 360/99.12 |
| 2002/0067569 A1* | 6/2002 | Choo et al. .............. | 360/98.08 |
| 2002/0109939 A1* | 8/2002 | Schwandt et al. ........ | 360/99.12 |
| 2003/0193738 A1* | 10/2003 | Renken ................... | 360/98.07 |
| 2004/0032691 A1* | 2/2004 | Drake et al. ............ | 360/99.12 |
| 2005/0185328 A1* | 8/2005 | Iwahara et al. .......... | 360/99.08 |
| 2007/0263321 A1* | 11/2007 | Chan et al. .............. | 360/99.12 |

FOREIGN PATENT DOCUMENTS

| | | |
|---|---|---|
| JP | 11-096660 | 4/1999 |
| JP | 2000-100062 | 4/2000 |
| JP | 2000-348408 | 12/2000 |

* cited by examiner

*Primary Examiner*—Jefferson Evans
(74) *Attorney, Agent, or Firm*—Volentine & Whitt, PLLC

(57) ABSTRACT

A hard disk drive comprising balance weight integrally coupled to a clamp is provided. The hard disk drive comprises a disk stack assembly comprising a disk, a spindle motor comprising a rotational shaft and a spindle motor hub adapted to support the disk, and a clamp comprising a plurality of installation holes. The hard disk drive further comprises at least one clamp screw and a balance weight integrally coupled to the clamp and adapted to compensate for an imbalance in the disk stack assembly.

11 Claims, 7 Drawing Sheets

HARD DISK DRIVE HAVING A BALANCE WEIGHT TO COMPENSATE FOR AN IMBALANCE IN THE DISK STACK ASSEMBLY

BACKGROUND OF THE INVENTION

1. Field of the Invention

Embodiments of the invention relate to a hard disk drive. In particular, embodiments of the invention relate to a hard disk drive comprising a clamp, and a balancing weight is coupled to the clamp.

This application claims priority to Korean Patent Application No. 10-2005-0114044, filed on Nov. 28, 2005, the subject matter of which is hereby incorporated by reference in its entirety.

2. Description of Related Art

Hard disk drives (HDDs), which comprise both electronic and mechanical parts, are memory devices adapted to store data for later recovery by converting digital electric pulses into a magnetic field adapted for more permanent storage. HDDs are widely used as auxiliary memory devices in computer systems because HDDs allow relatively rapid access to a relatively large amount of data.

Recent increases in TPI (tracks per inch) and BPI (bits per inch) capabilities have generally improved the performance of contemporary HDDs. HDDs are thus being used in a broader range of applications. For example, a compact HDD having a diameter of 0.85 inches has recently been developed and is expected to be used in future mobile phones.

FIG. 1 is a perspective view of a conventional hard disk drive, and FIG. 2 is a cross-sectional view of a disk stack assembly of the hard disk drive of FIG. 1. Referring to FIGS. 1 and 2, a conventional hard disk drive 101 comprises disk stack assembly 110 comprising a plurality of disks 111 adapted to store data, and a head stack assembly (HSA) 130 adapted to read data from disks 111 while pivoting upon a pivot shaft 137 to move across disks 111. Conventional hard disk drive 101 further comprises a printed circuit board assembly (PCBA) 140, which is adapted to control the previously described elements of conventional hard disk drive 101. In PCBA 140, most circuit parts are installed on a printed circuit board (PCB). Conventional hard disk drive 101 further comprises a base 150 on which the previously described elements of conventional hard disk drive 101 are disposed, and a cover 160 adapted to cover base 150.

Disk stack assembly 110 comprises disks 111, a spindle motor 113 comprising a spindle motor hub 112 adapted to support and rotate disks 111, a spacer 117 disposed between two disks 111 and adapted to separate the two disks 111 from one another, a clamp 115 adapted to elastically press disks 111 between clamp 115 and spindle motor hub 112 to thereby fix disks 111 to spindle motor hub 112 (i.e., hold disks 111 fast to spindle motor hub 112), and a clamp screw 114 that passes through an installation hole 116 formed in clamp 115 and is screwed into (i.e., screw coupled to) a screw hole (not shown) formed in spindle motor hub 112. Clamp screw 114 presses clamp 115 so that clamp 115 will thereby fix disks 111 to spindle motor hub 112.

Imbalance occurs in a rotating system such as head stack assembly 130 or disk stack assembly 110 when there is a disparity between the center of gravity of the rotating system and the center of rotation for the rotating system. A static imbalance occurs in the rotating system when the previously mentioned disparity arises when the rotating system is not being rotated. A dynamic imbalance occurs in the rotating system when the previously mentioned disparity arises when the rotating system is rotating. An imbalance in a rotating system causes vibration and noise when the system rotates. In particular, in disk stack assembly 110, when there is a disparity between the cumulative center of gravity of disks 111 and the center of rotation for a rotational shaft 139 of spindle motor 113, a ball bearing or fluid bearing of spindle motor 113 may be damaged, which may reduce the reliability of conventional hard disk drive 101. Although there are many reasons for an imbalance to occur in disk stack assembly 110, an imbalance is mainly generated because elements such as spindle motor 113, disks 111, and spacer 117 of disk stack assembly 110 each have their own tolerance, i.e., the outer diameter of an upper portion 125 of spindle motor hub 112 of spindle motor 113, the inner diameter of each disk 111, and the inner diameter of spacer 117 each have their own length. That is, the imbalance is generated when the center of rotation for each element of disk stack assembly 110 (i.e., the center of rotation for the entire disk stack assembly 110) does not match the center of gravity of the entire disk stack assembly 110.

Many studies have been conducted in attempts to remedy the imbalance in disk stack assembly 110. For example, referring to FIG. 2, in disk stack assembly 110 of conventional hard disk drive 101, two disks 111 are pushed in opposite directions as indicated by arrows 118 and 119 to adjust the position of each of disks 111 with respect to the center of rotation for rotational shaft 139 (i.e., to bias each of disks 111) to improve the balance of disk stack assembly 110. A problem with this technique, however, is that it cannot be used for a hard disk drive comprising a single disk.

FIG. 3 is a cross-sectional view of a disk stack assembly 110a of another conventional hard disk drive. Referring to FIG. 3, in the conventional hard disk drive, a disk 111a and a spacer 117a are pushed in opposite directions as indicated by arrows 120 and 121 to adjust the positions of disk 111a and spacer 117a with respect to the center of rotation for rotational shaft 139a (i.e., to bias disk 111a and spacer 117a) to improve the balance of disk stack assembly 110a. FIG. 3 also shows a spindle motor hub 112a, a spindle motor 113a, and a clamp 115a. In the conventional device of FIG. 3, when using spacer 117a to improve the balance of disk stack assembly 110a, since changing the dimensions or volume of spacer 117a in the axial direction is strictly limited due to the characteristic(s) of spacer 117a, changing the dimensions, volume, or position of spacer 117a in the radial direction is unavoidable. Thus, the problem of reducing a data zone of disk 111a arises. In addition, when spacer 117a is omitted in an effort to reduce the cost of the hard disk drive comprising disk stack assembly 110a, the technique of adjusting the position of spacer 117a cannot be used.

Additional methods considered for balancing a disk stack assembly that has an imbalance due to the assembly of the corresponding hard disk drive are attaching an adhesive to the clamp, or screwing a balance weight to an installation hole of the clamp, wherein the installation hole is not occupied by a clamp screw. If an adhesive is attached to the clamp, the adhesive would be an additional part of the disk stack assembly.

The method of attaching the adhesive, however, may generate a contaminant in the hard disk drive and require a cleaning process. In addition, a special environment is needed to cure the adhesive, and the time needed to perform the process of curing the adhesive would extend the amount of time needed to assemble the hard disk drive.

Also, even when the method of screwing a balance weight into an installation hole that is not occupied by a clamp screw is used to compensate for a static imbalance in the disk stack assembly, a dynamic imbalance may still occur. In a dynamic imbalance, there is a disparity between the center of rotation for a rotational shaft of a spindle motor of the disk stack assembly and the center of gravity of the disk stack assembly when the hard disk drive is operated and the spindle motor is rotated after the hard disk drive is assembled. When the method of screwing a balance weight into an unoccupied installation hole is used to compensate for the static imbalance, it may be difficult or complicated to further compensate for a dynamic imbalance since the balance weight has been screwed into an installation hole of the clamp; and thus, the dynamic imbalance weight may need to be installed in the installation hole in which the balance weight has already been installed.

SUMMARY OF THE INVENTION

Embodiments of the invention provide a hard disk drive adapted to compensate for a static imbalance in a disk stack assembly, which arises while the hard disk drive is being assembled, without adding components to the disk stack assembly or causing a direct reduction of a data zone of a disk in the disk stack assembly. Embodiments of the invention also provide a hard disk drive adapted to readily compensate for a dynamic imbalance, which arises after the hard disk drive has been assembled and while a disk stack assembly of the hard disk drive is being rotated, as compared to a conventional hard disk drive.

In one embodiment, the invention provides a hard disk drive comprising a disk stack assembly comprising a disk, a spindle motor adapted to rotate the disk and comprising a rotational shaft and a spindle motor hub adapted to support the disk, and a clamp comprising a plurality of installation holes. The hard disk drive further comprises at least one clamp screw coupled to one of the plurality of installation holes, and coupled to the spindle motor hub to fix the disk to the spindle motor hub by elastically pressing the disk between the clamp and the spindle motor hub. The hard disk drive still further comprises a balance weight integrally coupled to the clamp and adapted to compensate for an imbalance in the disk stack assembly.

In another embodiment, the invention provides a hard disk drive comprising a disk stack assembly comprising a disk, a spindle motor adapted to rotate the disk and comprising a rotational shaft and a spindle motor hub adapted to support the disk, and a clamp comprising a plurality of installation holes. The hard disk drive further comprises at least one clamp screw coupled to one of the plurality of installation holes, and coupled to the spindle motor hub to fix the disk to the spindle motor hub by elastically pressing the disk between the clamp and the spindle motor hub. The hard disk drive still further comprises a balance weight peripherally coupled to the clamp outside of the plurality of installation holes, and adapted to compensate for an imbalance in the disk stack assembly.

BRIEF DESCRIPTION OF THE DRAWINGS

Embodiments of the invention will be described with reference to the accompanying drawings, in which like reference symbols indicate like or similar elements throughout. In the drawings.

DESCRIPTION OF EMBODIMENTS

As used herein, when a first element is said to be "on" a second element, the first element may be directly on the second element, or intervening elements may be present.

Figure 4:
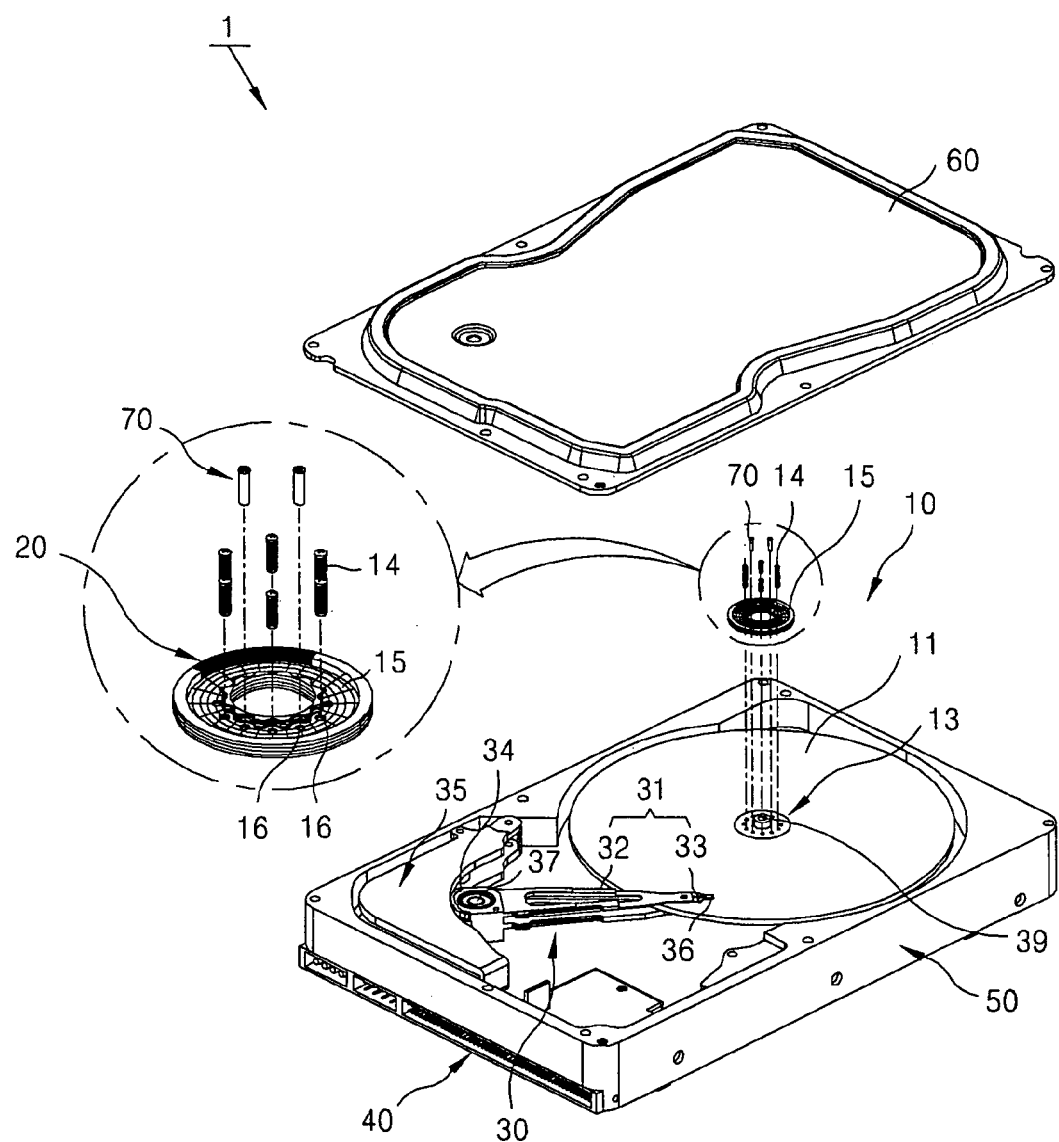
FIG. 4 is an exploded perspective view of a hard disk drive in accordance with an embodiment of the invention.
Figure 5:
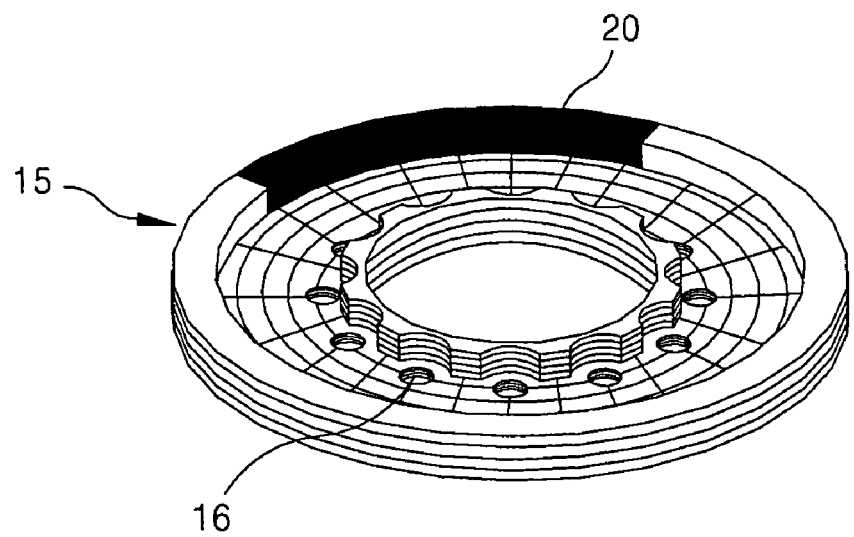
FIG. 5 is a perspective view of a clamp of the hard disk drive of FIG. 4.

FIG. 4 is an exploded perspective view of a hard disk drive 1 in accordance with an embodiment of the invention. FIG. 5 is a perspective view of a clamp of hard disk drive 1 of FIG. 4. Referring to FIGS. 4 and 5, hard disk drive 1, in accordance with an embodiment of the invention, comprises a disk stack assembly 10 comprising a disk 11 adapted to store data, and a balance weight 20 adapted to compensate for an imbalance (i.e., a static imbalance) caused by the existence of a disparity between of the center of gravity of disk stack assembly 10 and the center of rotation for a rotational shaft 39 of a spindle motor 13. Hard disk drive 1 further comprises a head stack assembly (HSA) 30 adapted to read data from disk 11 while pivoting upon a pivot shaft 37 to move across disk 11, and a printed circuit board assembly (PCBA) 40 adapted to control the previously described elements, wherein most of the circuit parts in PCBA 40 are installed on a printed circuit board (PCB). Hard disk drive 1 still further comprises a base 50 on which the previously described elements are assembled, and a cover 60 adapted to cover base 50. When a reading or writing operation is initiated in hard disk drive 1, head 36 moves to a desired position on disk 11, which is rotating so that data may be read from or written to disk 11.

HSA 30 comprises an actuator arm 31 adapted to move head 36 to access data on disk 11, a pivot shaft holder 34 adapted to rotatably support pivot shaft 37, wherein actuator arm 31 is coupled to pivot shaft holder 34. HSA 30 further comprises a bobbin (not shown) that extends from pivot shaft holder 34 in the opposite direction of actuator arm 31, wherein a voice coil motor (VCM) coil is wound around the bobbin and is interposed between magnets (not shown) of a VCM 35. Actuator arm 31 comprises a swing arm 32 that is rotated around pivot shaft 37 by VCM 35, and a suspension 33. Swing arm 32 is adapted to support suspension 33 and suspension 33 comprises an end portion to which head 36 is attached.

VCM 35 is a drive motor adapted to rotate actuator arm 31 to move head 36 to a desired position on disk 11 in accordance with Fleming's Left Hand rule that a force is generated when current flows through a conductive material existing in a magnetic field. By applying current to the VCM coil interposed between the magnets, a force is applied to the bobbin causing the bobbin to pivot. Thus, actuator arm 31, which is coupled to pivot shaft holder 34 and extends in a direction opposite of the bobbin, pivots so that head 36, which is attached to and supported by the end portion of actuator arm 31, moves across disk 11, which is rotating, and searches for a track on disk 11 in order to access data. Signal processing is then performed on the accessed data.

Disk stack assembly 10, which is adapted to rotate disk 11, comprises disk 11 adapted to store data, spindle motor 13 comprising rotational shaft 39 and a spindle motor hub 12

(see FIG. 6) adapted to support and rotate disk 11, and a clamp 15 comprising a plurality of installation holes 16. Disk stack assembly 10 further comprises at least one clamp screw 14, and each of the at least one clamp screw 14 penetrates a respective one of the plurality of installation holes 16. Additionally, each of the at least one clamp screw 14 is screwed into (i.e., coupled to) spindle motor hub 12, so that, when clamp screw 14 is screwed into spindle motor hub 12, disk 11 is elastically pressed between clamp 15 and spindle motor hub 12, and thus is fixed (i.e., held fast) to spindle motor hub 12. As used herein, when a first element is said to be between a second element and a third element, the first element may be directly between the second and third elements, or intervening elements may be present. In the embodiment illustrated in FIGS. 4 through 6, clamp 15 comprises twelve installation holes 16. Also in the embodiment illustrated in FIGS. 4 through 6, disk stack assembly 10 comprises six clamp screws 14. The six clamp screws 14 respectively penetrate six of the twelve installation holes 16 in clamp 15 such that the six clamp screws 14 are symmetrically disposed around the center of clamp 15. The six clamp screws 14 are also screwed into (i.e., coupled to) spindle motor hub 12. When the six clamp screws 14 penetrate installation holes 16 and are screwed into spindle motor hub 12, an inner edge portion of clamp 15 is pressed toward spindle motor hub 12 by the six clamp screws 14. Thus, an outer edge portion of clamp 15 elastically presses disk 11 towards spindle motor hub 12, and disk 11 is thereby fixed to spindle motor hub 12.

In the configuration described above, wherein disk 11 is fixed to spindle motor hub 12, disk 11 rotates with spindle motor hub 12. That is, an electromagnetic force is generated by the interaction of a starter core (not shown) and a magnet (not shown) installed on spindle motor hub 12. Spindle motor hub 12 is rotated by electromagnetic force that is generated, and disk 11, which is fixed to spindle motor hub 12, rotates simultaneously with spindle motor hub 12.

Figure 6:
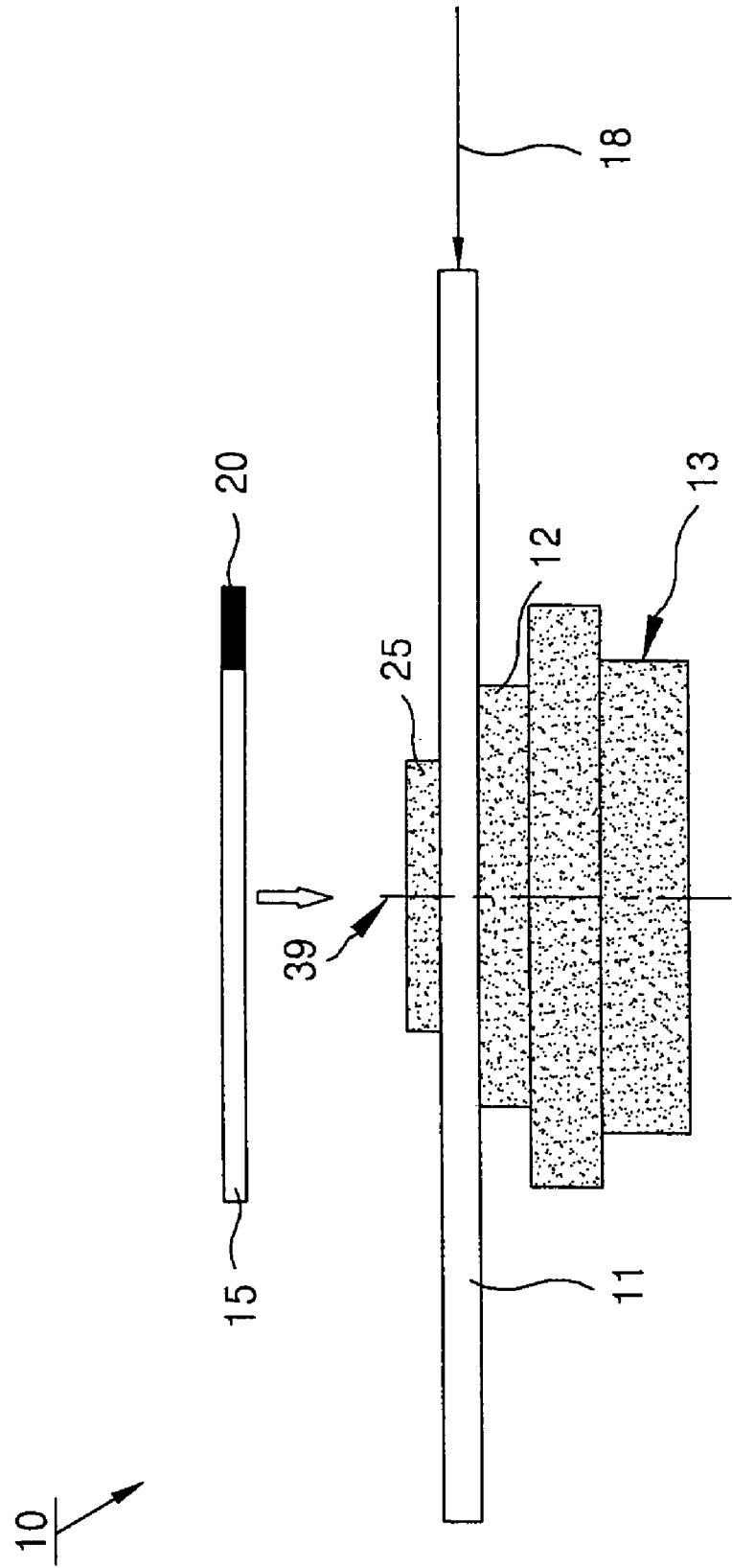
FIG. 6 is a cross-sectional view of a disk stack assembly of the hard disk drive of FIG. 4.

Also in disk stack assembly 10 of FIGS. 4 through 6, a balance weight 20 is integrally coupled to clamp 15. As used herein, when a second element is said to be "integrally coupled" to a first element it means that a first portion defining a first region of the first element has been removed leaving the first region empty, and the second element is coupled to the first element in the first region. In the embodiment illustrated in FIGS. 4 through 6, a first portion of clamp 15 disposed outside of installation holes 16 is cut from clamp 15 and balance weight 20 is inserted into the region from which the first portion of clamp 15 was cut to fill the region and restore clamp 15 to its original shape. Balance weight 20 can be coupled to clamp 15 in a variety of ways, such as by forced insertion. In the embodiment illustrated in FIGS. 4 through 6, balance weight 20 is attached to clamp 15 using an adhesive. Also, clamp 15 is formed from aluminum while balance weight 20 is formed from a metal material having a higher specific gravity than aluminum. In the embodiment illustrated in FIGS. 4 through 6, the metal material is stainless steel. Thus, the center of gravity of clamp 15 is eccentric towards balance weight 20 from the geometric center of clamp 15.

In the configuration of clamp 15 described above, balance weight 20 is adapted to compensate for an imbalance (i.e., a static imbalance) in disk stack assembly 10. The imbalance may arise during the assembly of disk stack assembly 10 because the inner diameter of disk 11 is greater than the outer diameter of an upper portion 25 of spindle motor hub 12 (i.e., the imbalance may arise during assembly of disk stack assembly 10 due to tolerance in the dimension of the inner diameter of disk 11 and the outer diameter of upper portion 25 of spindle motor hub 12). In more detail, as shown in FIG. 6, disk 11 is installed off-center (i.e., biased), with respect to the center of rotation for rotational shaft 39, in the direction indicated by arrow 18 of FIG. 6. Balance weight 20 is installed to compensate for the amount of imbalance caused by the off-center installation of disk 11 with respect to the center of rotation for rotational shaft 39. Adjusting the position of a disk with respect to the center of rotation for rotational shaft 39 or installing a disk off-center with respect to the center of rotation for rotational shaft 39 may each be referred to herein as "biasing" a disk.

The weight and position of balance weight 20 are determined using the following method. First, a disk 11 is installed off-center with respect to the center of rotation for rotational shaft 39, and the amount of imbalance caused by disk 11, with respect to the center of rotation for rotational shaft 39, is measured. The same process is then performed for a plurality of disks 11. Through statistical analysis of the measurements taken for each of disks 11, an average amount and direction of imbalance for all of disks 11 is found and is modeled as a single disk having a single amount of imbalance in a first direction with respect to the center of rotation for rotational shaft 39. Balance weight 20 is then integrally coupled to clamp 15 to compensate for the average amount and direction of imbalance of all of disks 11 obtained through the process described above. That is, balance weight 20 is integrally coupled to clamp 15 and the center of gravity of clamp 15 becomes eccentric in a second direction opposite the first direction with respect to the center of rotation for rotational shaft 39 such that clamp 15 offsets the imbalance of disks 11. When balance weight 20 is integrally coupled to clamp 15, balance weight 20 completes the original shape of clamp 15 (i.e., restores clamp 15 to its original shape).

In the embodiment illustrated in FIG. 6, balance weight 20 is integrally coupled to clamp 15 in a second direction with respect to the center of rotation for rotational shaft 39, wherein disk 11 is installed off-center in a first direction with respect to the center of rotation for rotational shaft 39, causing a disparity between the center of gravity of disk stack assembly 10 and the center of rotation for rotational shaft 39 in the first direction (relative to the center of rotation for rotational shaft 39), which is opposite the second direction. In accordance with the embodiment of the invention illustrated in FIGS. 4 through 6, disk stack assembly 10 is balanced without adding an additional part to disk stack assembly 10 because balance weight 20 is integrally coupled to and restores the original shape of clamp 15, and thus is a component of clamp 15. Thus, balance weight 20 is not an "additional part" of disk stack assembly 10, as used herein, because it becomes a part of clamp 15, which is restored to its original shape after balance weight 20 is integrally coupled to clamp 15. Also, although balance weight 20 is attached to clamp 15 using an adhesive, balance weight 20 and the adhesive are used to reform clamp 15 to its original shape, and not to add an additional part to clamp 15 that would change the shape of clamp 15. Also, because of the characteristic(s) of the light material from which clamp 15 is formed, clamp 15 having an eccentric center of gravity is more readily formed by replacing a section of clamp 15 with a metal having a different density than the material from which clamp 15 is formed than by changing the shape of clamp 15. Further, embodiments of the invention can be readily applied without changing the design of clamp 15.

Figure 1:
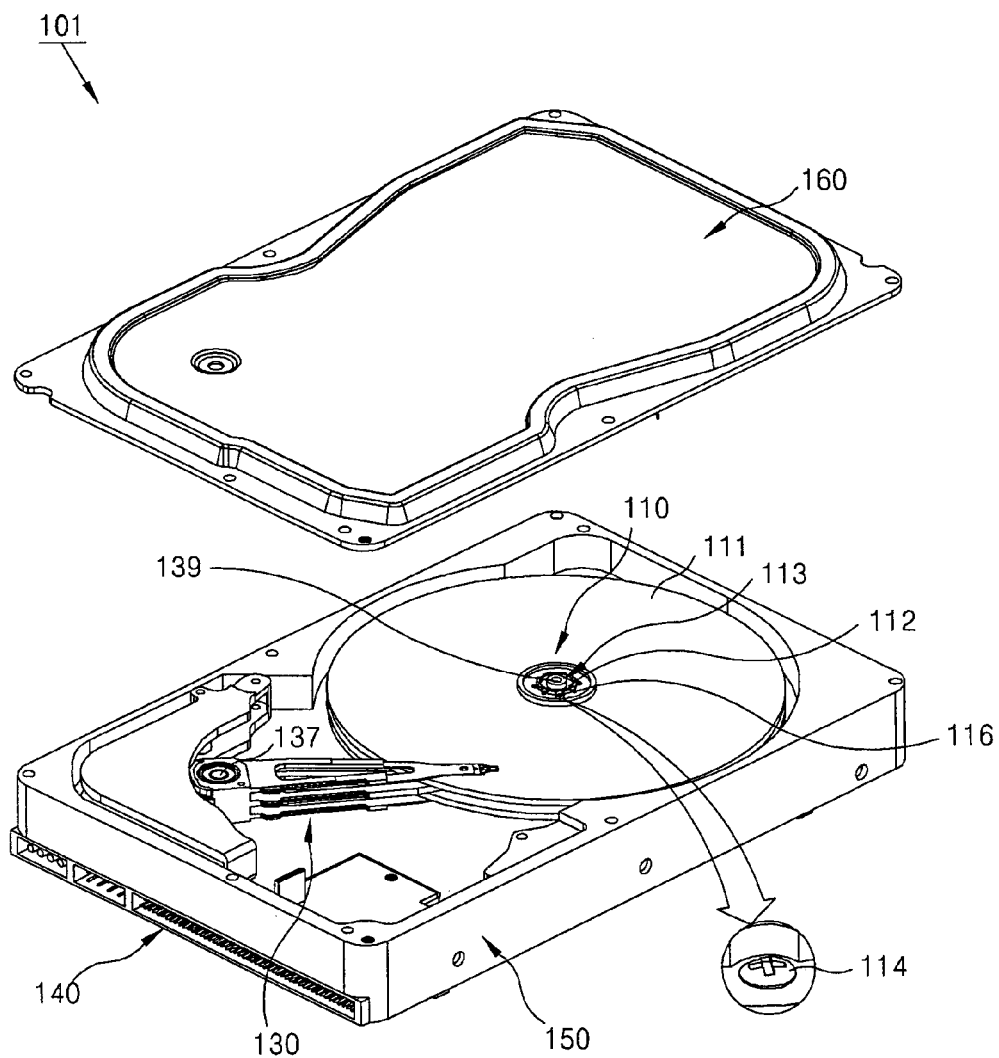
FIG. 1 is a perspective view of a conventional hard disk drive.
Figure 2:
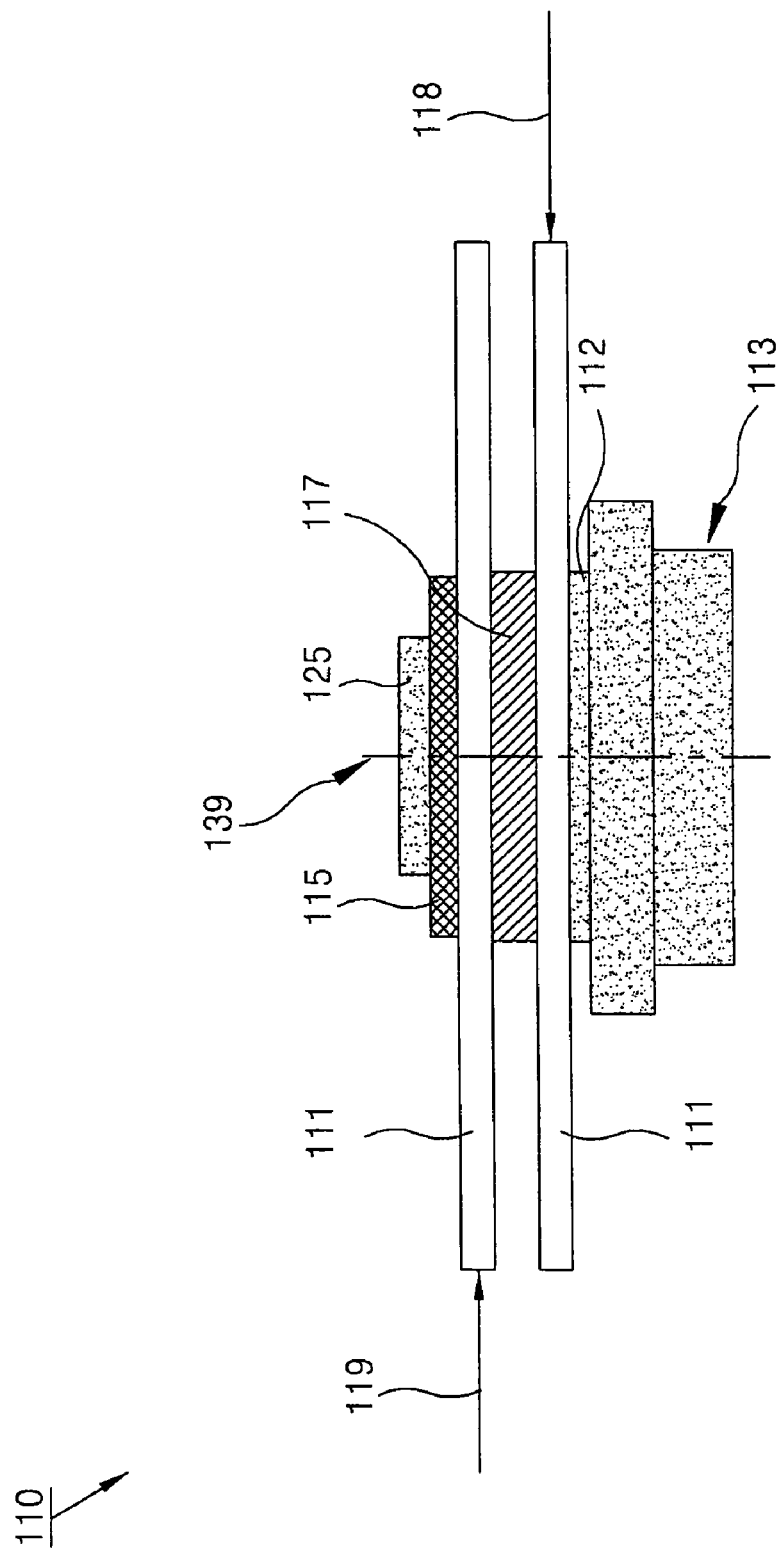
FIG. 2 is a cross-sectional view of a disk stack assembly of the conventional hard disk drive of FIG. 1.
Figure 3:
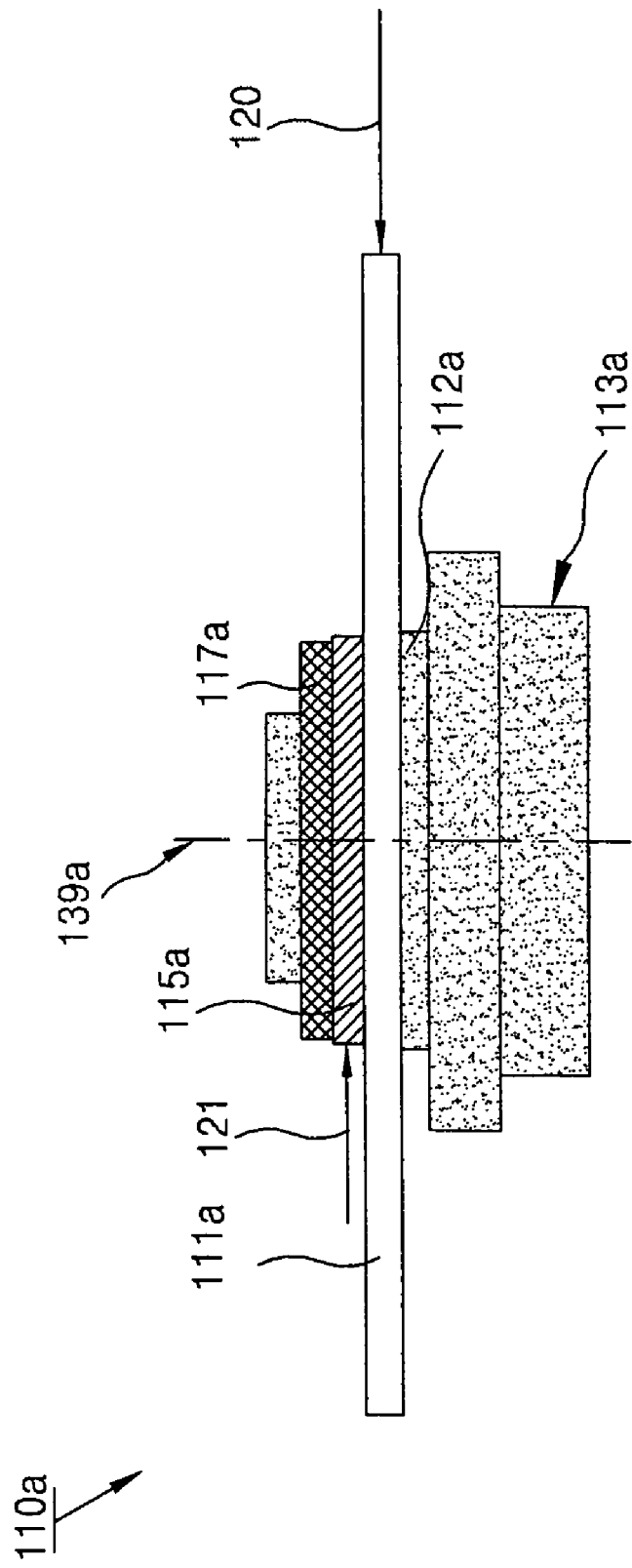
FIG. 3 is a cross-sectional view of a disk stack assembly of another conventional hard disk drive.

In addition, a dynamic imbalance, which may occur when hard disk drive 1 is driven, may be prevented when, in accordance with embodiments of the invention, balance weight 20 is integrally coupled to clamp 15 in an area outside of installation holes 16, rather than a balance weight being installed in an installation hole 16, as in a conventional hard disk drive. That is, if a first balance weight is installed in a first installation hole 16 to compensate for a static imbalance in disk stack assembly 10, and if a dynamic imbalance then occurs due to the rotation of disk stack assembly 10 when hard disk drive 1 is driven, a dynamic balance weight 70 will need to be installed in an installation hole 16 of clamp 15 in order to compensate for the dynamic imbalance. However, dynamic imbalance weight 70 may need to be installed in first installation hole 16 in which the first balance weight has already been installed. Thus, it may be difficult to compensate for a dynamic imbalance in hard disk drive 1 when the first balance weight is installed in first installation hole 16 because it may not be possible to install dynamic balance weight 70 in the desired position. However, in accordance with embodiments of the invention, balance weight 20 does not occupy any installation hole 16, so it will not occupy an installation hole 16 in which dynamic balance weight 70 may need to be installed. In addition, unlike a conventional technique, when disk stack assembly 10 is balanced in accordance with embodiments of the invention, the data zone of disk 11 is not directly reduced. However, referring to FIG. 3, the data zone of disk 111a may be directly reduced by the off-center installation of spacer 117a. Also, if the position of clamp 15 needs to be adjusted with respect to the center of rotation for rotational shaft 39, particles may be generated due to contact between metals in the adjusting process; however, in accordance with embodiments of the invention, the position of clamp 15 does not need to be adjusted with respect to the center of rotation for rotational shaft 39, so the previously mentioned generation of particles during the adjusting process can be prevented since the position of clamp 15 does not need to be adjusted.

In the embodiment illustrated in FIGS. 4 through 6, at least one dynamic balance weight 70 can be installed in disk stack assembly 10 in addition to balance weight 20 to compensate for dynamic imbalance that may occur as a result of a misalignment between the center of gravity of disk stack assembly 10 and the center of rotation for rotational shaft 39 of spindle motor 13 when spindle motor hub 12 rotates. Accordingly, unlike in a conventional device, in the embodiment illustrated in FIGS. 4 through 6, a dynamic imbalance can be readily compensated for through the installation of at least one dynamic balancing weight 70 in respective installation holes 16 even when the dynamic imbalance occurs after the installation of clamp 15 comprising balance weight 20 has substantially compensated for a static imbalance in disk stack assembly 10. In the embodiment illustrated in FIG. 4, two dynamic balance weights 70 are installed in two respective installation holes 16 in which clamp screws 14 are not installed, and each of dynamic balance weights 70 is disposed between a pair of adjacent clamp screws 14. As shown in FIG. 4, each of dynamic balance weights 70 is disposed between a pair of adjacent clamp screws 14 along the circumference of the circular shape formed by installation holes 16 of FIG. 4.

In accordance with the embodiment illustrated in FIGS. 4 through 6, prior to designing clamp 15, a disk 11 is installed off-center with respect to the center of rotation for rotational shaft 39 of spindle motor 13, and the amount of imbalance with respect to the center of rotation for rotational shaft 39 caused by the off-center installation of disk 11 is measured. The same process may then be performed for a plurality of disks 11. Next, through statistical analysis of the measurements taken for each of disks 11, an average amount and direction of imbalance (i.e., static imbalance) for all of disks 11 is found and is modeled as a single disk having a single amount of imbalance in a first direction with respect to the center of rotation for rotational shaft 39. Then, to compensate for the average amount of imbalance found previously, clamp 15 is designed and manufactured such that clamp 15 has an eccentric center of gravity sufficient to offset the average imbalance when the clamp is disposed on disk stack assembly 10 such that the eccentric center of gravity is disposed in a second direction opposite the first direction relative to the center of rotation for rotational shaft 39.

In the embodiment illustrated in FIG. 6, disk 11 is supported on spindle motor hub 12 and adjusted off-center in a first direction with respect to the center of rotation for rotational shaft 39, as indicated by arrow 18, and thus the center of gravity of disk 11 is misaligned with the center of rotation for rotational shaft 39 in the first direction. Clamp 15 is arranged such that balance weight 20 is disposed in a second direction opposite the first direction with respect to the center of rotation for rotational shaft 39, and clamp screw 14 is coupled to clamp 15. Accordingly, clamp 15 compensates for the static imbalance in disk stack assembly 10 caused by a misalignment between the center of gravity of disk stack assembly 10 and the center of rotation for rotational shaft 39 without adding an additional part to disk stack assembly 10, as described previously.

However, when hard disk drive 1 is driven, a dynamic imbalance may occur due to the rotation of disk stack assembly 10, and when dynamic imbalance does occur, the dynamic imbalance is measured. To compensate for the dynamic imbalance, one or more dynamic balance weights 70 may be installed in respective installation holes 16 in accordance with the measured dynamic imbalance. In accordance with embodiments of the invention, dynamic imbalance may be readily compensated for because balance weight 20 is not installed in any of installation holes 16 during the assembly of disk stack assembly 10.

Once a fully assembled hard disk drive 1 begins performing reading and writing operations, actuator arm 31 moves head 36 to a desired position on disk 11 to perform a corresponding reading or writing operation. Since the static and dynamic imbalances in disk stack assembly 10 are substantially compensated for in accordance with embodiments of the invention, vibration and noise are greatly reduced in comparison to a conventional device. Also, since damage to a ball bearing or fluid bearing of spindle motor 13 is greatly reduced in comparison to a conventional device, the quality of hard disk drive 1, in accordance with embodiments of the invention, is improved.

Figure 7:
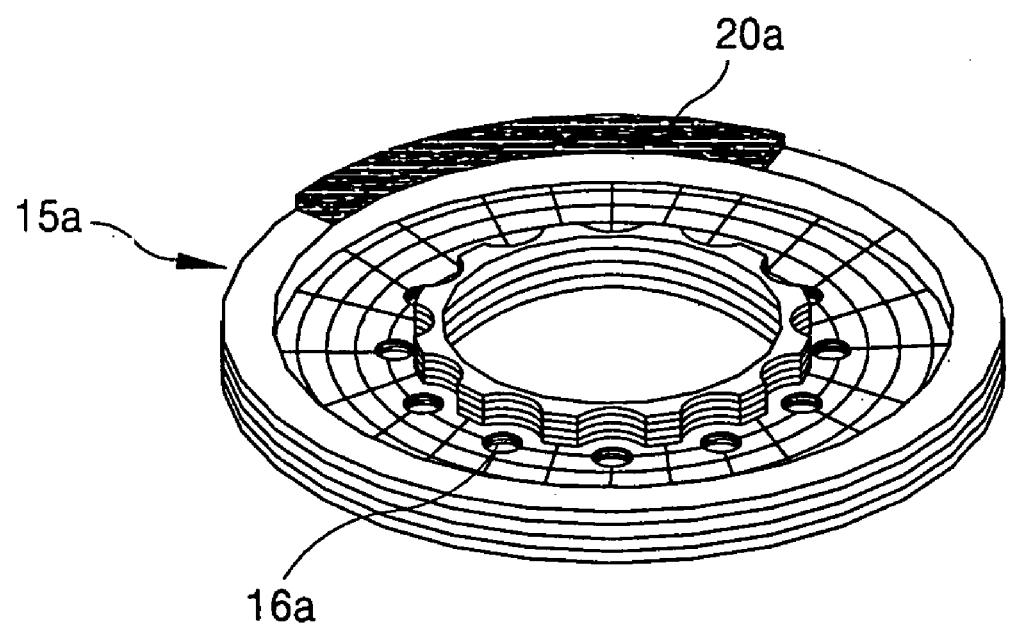
FIG. 7 is a perspective view of a clamp of a hard disk drive in accordance with another embodiment of the invention.

In accordance with an embodiment of the invention, clamp 15 of hard disk drive 1 can also have a different structure than the structure illustrated in FIG. 5. FIG. 7 is a clamp 15a of hard disk drive 1 in accordance with another embodiment of the invention. In the embodiment illustrated in FIG. 7, except for clamp 15a and balance weight 20a, the components of hard disk drive 1 are the same as the components described previously with reference to FIGS. 4 and 6, so further description of those elements will be omitted here.

In the embodiment illustrated in FIG. 7, a balance weight 20a is disposed along the outer circumference of a clamp 15a and is coupled to the outer circumferential surface of clamp 15a. FIG. 7 also illustrates installation holes 16a formed in clamp 15a.

Although the illustrated embodiment of hard disk drive 1 of FIGS. 4 through 6, and the illustrated embodiment of FIGS. 4, 6, and 7, each comprise a single disk 11, an odd-numbered plurality of disks 11 may be provided in another embodiment of the invention. As used herein, an "odd-numbered plurality of disks" (i.e., "odd-numbered plurality of disks 11") is a plurality of disks wherein the plurality comprises an odd number of disks. A spacer may be interposed between each pair of adjacent disks 11 to separate adjacent disks 11. Disks 11 are installed such that they are alternately biased in opposite directions with respect to the center of rotation for rotational shaft 39. As mentioned previously, adjusting the position of a disk with respect to the center of rotation for rotational shaft 39 may be referred to herein as "biasing" a disk. In addition, as used herein, when the disks of a plurality of disks are said to be "alternately biased in opposite directions" it means that the odd-numbered plurality of disks comprises a first plurality of disks and a second plurality of disks, wherein the only disks adjacent to disks of the first plurality are disks of the second plurality, the only disks adjacent to disks of the second plurality are disks of the first plurality, no disk is in both the first and second pluralities, each disk of the first plurality is biased in a first direction with respect to a center of rotation for a rotational shaft, and each disk of the second plurality is biased in a second direction opposite the first direction with respect to the center of rotation for the rotational shaft. Balance weight 20 is coupled to clamp 15 to offset the amount of imbalance generated by an un-paired disk 11 of the odd-numbered plurality of disks 11 (i.e., an un-paired disk 11 in disk stack assembly 10), which is biased with respect to the center of rotation for rotational shaft 39. As used herein, an "un-paired" disk 11 is the disk that remains un-paired when disks 11 of the odd-numbered plurality of disks 11 are sequentially grouped into pairs of adjacent disks, wherein each disk 11 belongs to only one pair of disks or no pair of disks (i.e., it is the un-paired disk 11).

In the embodiment illustrated in FIGS. 4 through 6, and in the embodiment illustrated in FIG. 7, clamp 15 comprises twelve installation holes 16; however, clamp 15 may comprise a different number of installation holes 16.

In accordance with embodiments of the invention, an imbalance in the disk stack assembly that arises during the assembly of a hard disk drive can be compensated for without directly reducing a data zone of a disk or requiring an additional part. In particular, embodiments of the invention may efficiently compensate for an imbalance (i.e., a static imbalance) in a disk stack assembly of a hard disk drive comprising one disk or another odd number of disks, wherein the imbalance arises when the hard disk drive is assembled. In addition, in accordance with embodiments of the invention, the number of changes in the design of the hard disk drive necessary to balance the hard disk drive may be reduced. Also, compared to a conventional device, embodiments of the invention may readily compensate for a dynamic imbalance that may arise after a hard disk drive has been assembled. Therefore, compared to a conventional device, vibration and noise generated by an imbalance in a hard disk drive can be reduced, and damage to a ball bearing or fluid bearing of a spindle motor can be reduced.

Although embodiments of the invention have been described herein, changes may be made to the embodiments by one skilled in the art without departing from the scope of the invention as defined by the accompanying claims.

What is claimed is:

1. A hard disk drive having a balance weight to compensate for an imbalance in the disk stack assembly comprising:
   a disk stack assembly comprising at least one disk,
   a spindle motor adapted to rotate the disk and comprising a rotational shaft and a spindle motor hub adapted to support the disk,
   a clamp comprising a plurality of installation holes, wherein the clamp has an annular shape including a removed section, and
   at least one clamp screw coupled to one of the plurality of installation holes, and coupled to the spindle motor hub to fix the disk to the spindle motor hub by elastically pressing the disk between the clamp and the spindle motor hub; and,
   the balance weight integrally coupled to the clamp and configured to compensate for an imbalance in the disk stack assembly, wherein the balance weight is peripherally coupled to the clamp outside of the plurality of installation holes and shaped to fill the removed section of the clamp.

2. The hard disk drive of claim 1, wherein an inner diameter of the disk is greater than an upper portion of the spindle motor hub.

3. The hard disk drive of claim 2, wherein the disk is disposed off-center with respect to a center of rotation for the rotational shaft, and the clamp and the balance weight are adapted to offset an imbalance resulting from the disk being so disposed.

4. The hard disk drive of claim 2, wherein:
   the disk stack assembly comprises a plurality of disks, each disk being disposed off-center with respect to the rotational center of the rotational shaft resulting in a plurality of second imbalances with respect to the center of rotation for the rotational shaft, wherein each second imbalance corresponds respectively to one of the plurality of disks; and,
   wherein the imbalance compensated by the balance weight is an average of the plurality of second imbalances.

5. The hard disk drive of claim 1, wherein the balance weight is integrally coupled to the clamp using an adhesive.

6. The hard disk drive of claim 5, wherein the clamp is formed from aluminum and the balance weight is formed from a material having a higher specific gravity than aluminum.

7. The hard disk drive of claim 6, wherein the balance weight is formed from stainless steel.

8. The hard disk drive of claim 1, further comprising a dynamic balance weight disposed in one of the plurality of installation holes and adapted to compensate for a disparity between the center of gravity of the disk stack assembly and the center of rotation for the rotational shaft occurring when the spindle motor hub rotates.

9. The hard disk drive of claim 8, wherein:
   the plurality of installation holes comprises twelve installation holes;
   the at least one clamp screw comprises six clamp screws, wherein each of the six clamp screws penetrates a different one of the twelve installation holes and the six clamp screws are disposed symmetrically around a center of the clamp; and,
   the dynamic balance weight is disposed in one of the installation holes not occupied by any one of the six clamp screws and is disposed between a pair of adjacent clamp screws.

10. The hard disk drive of claim 1, wherein:
    the disk stack assembly comprises an odd-numbered plurality of disks, wherein the disks of the odd-numbered plurality of disks are alternately biased in opposite directions; and,
    the balance weight is adapted to offset a first amount of imbalance caused by an un-paired disk in the disk stack assembly.

11. The hard disk drive of claim 10, further comprising a spacer interposed between a pair of adjacent disks of the odd-numbered plurality of disks.

* * * * *